United States Patent
Whitney

(10) Patent No.: US 11,619,646 B1
(45) Date of Patent: Apr. 4, 2023

(54) ANTENNA WINDSOCK ASSEMBLY

(71) Applicant: Tommy Whitney, Odessa, TX (US)

(72) Inventor: Tommy Whitney, Odessa, TX (US)

(*) Notice: Subject to any disclaimer, the term of this patent is extended or adjusted under 35 U.S.C. 154(b) by 0 days.

(21) Appl. No.: 17/475,816

(22) Filed: Sep. 15, 2021

(51) Int. Cl.
*G01P 13/02* (2006.01)

(52) U.S. Cl.
CPC .................................. *G01P 13/02* (2013.01)

(58) Field of Classification Search
CPC ........................................................ G01P 13/02
USPC ........................................................ 73/170.06
See application file for complete search history.

(56) References Cited

U.S. PATENT DOCUMENTS

| | | | | |
|---|---|---|---|---|
| 4,553,430 A | * | 11/1985 | Behrens | B64F 1/20 73/170.06 |
| 4,558,862 A | * | 12/1985 | Kelly | G01P 5/02 116/273 |
| 4,901,662 A | * | 2/1990 | Sandeen | B60Q 1/50 116/28 R |
| 5,319,967 A | * | 6/1994 | Rickards, Jr. | G01P 13/045 73/861.74 |
| 6,032,523 A | * | 3/2000 | Smith | G01P 13/02 73/170.07 |
| 6,672,243 B2 | * | 1/2004 | Seymour | G09F 21/042 116/28 R |
| 6,807,924 B1 | * | 10/2004 | Christiansen | G09F 17/00 116/174 |
| 9,295,896 B1 | * | 3/2016 | Hoang | A63B 71/0622 |
| 10,705,109 B2 | | 7/2020 | Coon | |
| 2002/0178993 A1 | | 12/2002 | Seymour | |
| 2006/0005618 A1 | * | 1/2006 | Thomas | G01P 13/02 73/170.01 |
| 2009/0140940 A1 | | 6/2009 | Giesbrecht | |

FOREIGN PATENT DOCUMENTS

EP 1426769 11/2003

* cited by examiner

*Primary Examiner* — Nathaniel T Woodward

(57) ABSTRACT

An antenna windsock assembly for indication wind direction to a driver of a vehicle includes a windsock that is comprised of an air impermeable material for capturing wind. The windsock is elongated such that the windsock can be elongated by the wind to indicate the direction of the wind. A ring is integrated into the windsock such that the ring retains the windsock in an open position to facilitate the wind to flow into the windsock. A pair of clips is each coupled to the ring and each of the clips is attachable to a radio antenna of a vehicle. In this way the windsock is visible to a driver of the vehicle thereby facilitating the driver to determine the direction of the wind.

8 Claims, 5 Drawing Sheets direction to gas/oil field

ANTENNA WINDSOCK ASSEMBLY

(b) CROSS-REFERENCE TO RELATED APPLICATIONS

Not Applicable

(c) STATEMENT REGARDING FEDERALLY SPONSORED RESEARCH OR DEVELOPMENT

Not Applicable

(d) THE NAMES OF THE PARTIES TO A JOINT RESEARCH AGREEMENT

Not Applicable

(e) INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

(f) STATEMENT REGARDING PRIOR DISCLOSURES BY THE INVENTOR OR JOINT INVENTOR

Not Applicable

(g) BACKGROUND OF THE INVENTION

(1) Field of the Invention

The disclosure relates to windsock devices and more particularly pertains to a new windsock device for indicating wind direction to a driver of a vehicle. The device includes a windsock and clips that are attached to the windsock. The clips attach to a radio antenna of a vehicle such that the windsock is visible to the driver.

(2) Description of Related Art Including Information Disclosed Under 37 CFR 1.97 and 1.98

The prior art relates to windsock devices including a windsock device that includes rotating couplers that extend around a stanchion for rotatably retaining a windsock on the stanchion. The prior art discloses a windsock device which has a pair of holes extending through the windsock device for insertably receiving a radio antenna of a vehicle. The prior art discloses a windsock device that comprises a roof mount that includes a ring and a windsock that is attached to the ring for mounting the windsock on a roof of a vehicle. The prior art discloses a radio antenna that includes a coupling which is rotatably integrated into the radio antenna and a windsock that is attachable to the coupling.

(h) BRIEF SUMMARY OF THE INVENTION

An embodiment of the disclosure meets the needs presented above by generally comprising a windsock that is comprised of an air impermeable material for capturing wind. The windsock is elongated such that the windsock can be elongated by the wind to indicate the direction of the wind. A ring is integrated into the windsock such that the ring retains the windsock in an open position to facilitate the wind to flow into the windsock. A pair of clips is each coupled to the ring and each of the clips is attachable to a radio antenna of a vehicle. In this way the windsock is visible to a driver of the vehicle thereby facilitating the driver to determine the direction of the wind.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

(i) BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

(j) DETAILED DESCRIPTION OF THE INVENTION

Figure 1:
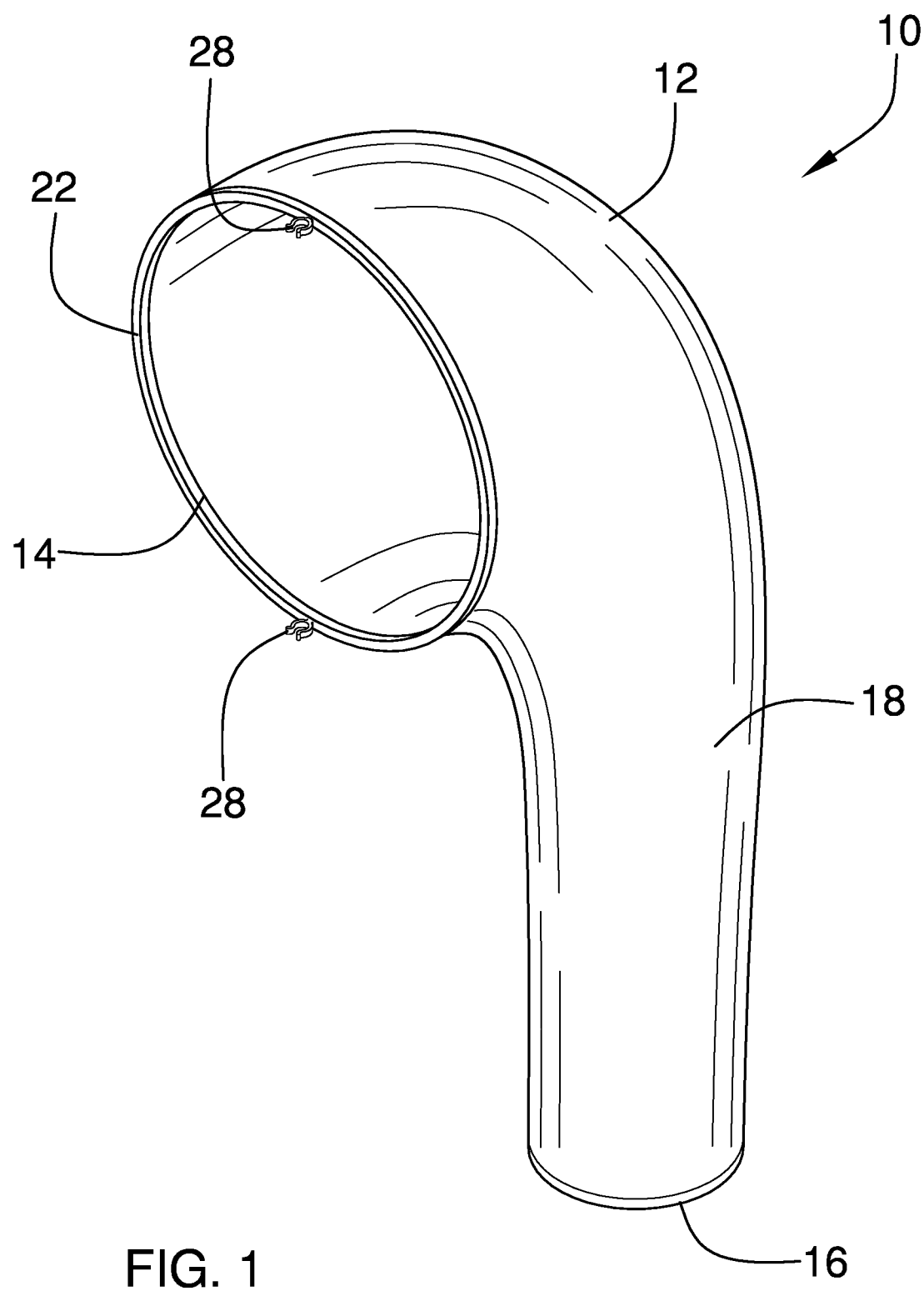
FIG. 1 is a perspective view of an antenna windsock assembly according to an embodiment of the disclosure.
Figure 2:
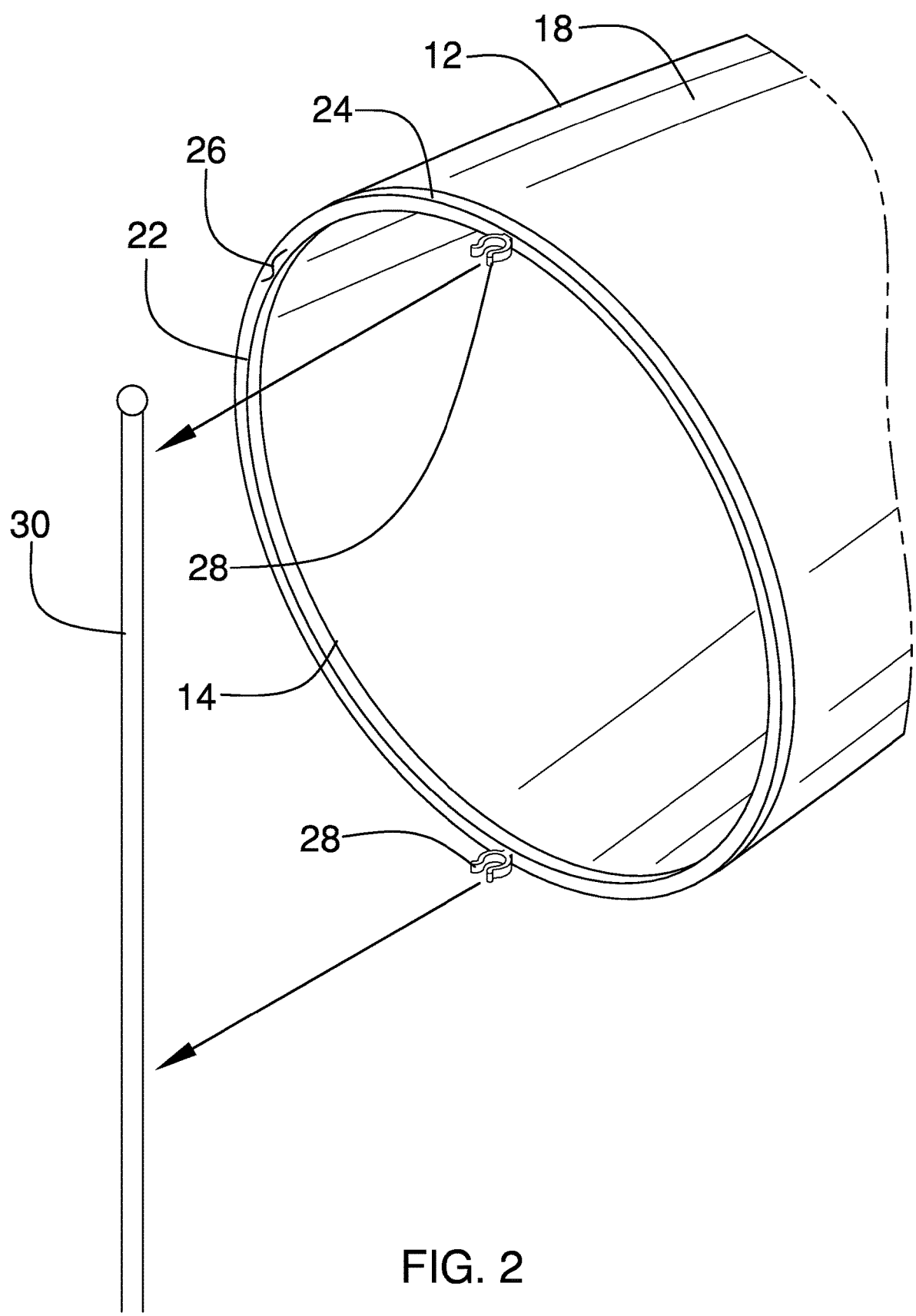
FIG. 2 is an exploded perspective view of an embodiment of the disclosure.
Figure 3:
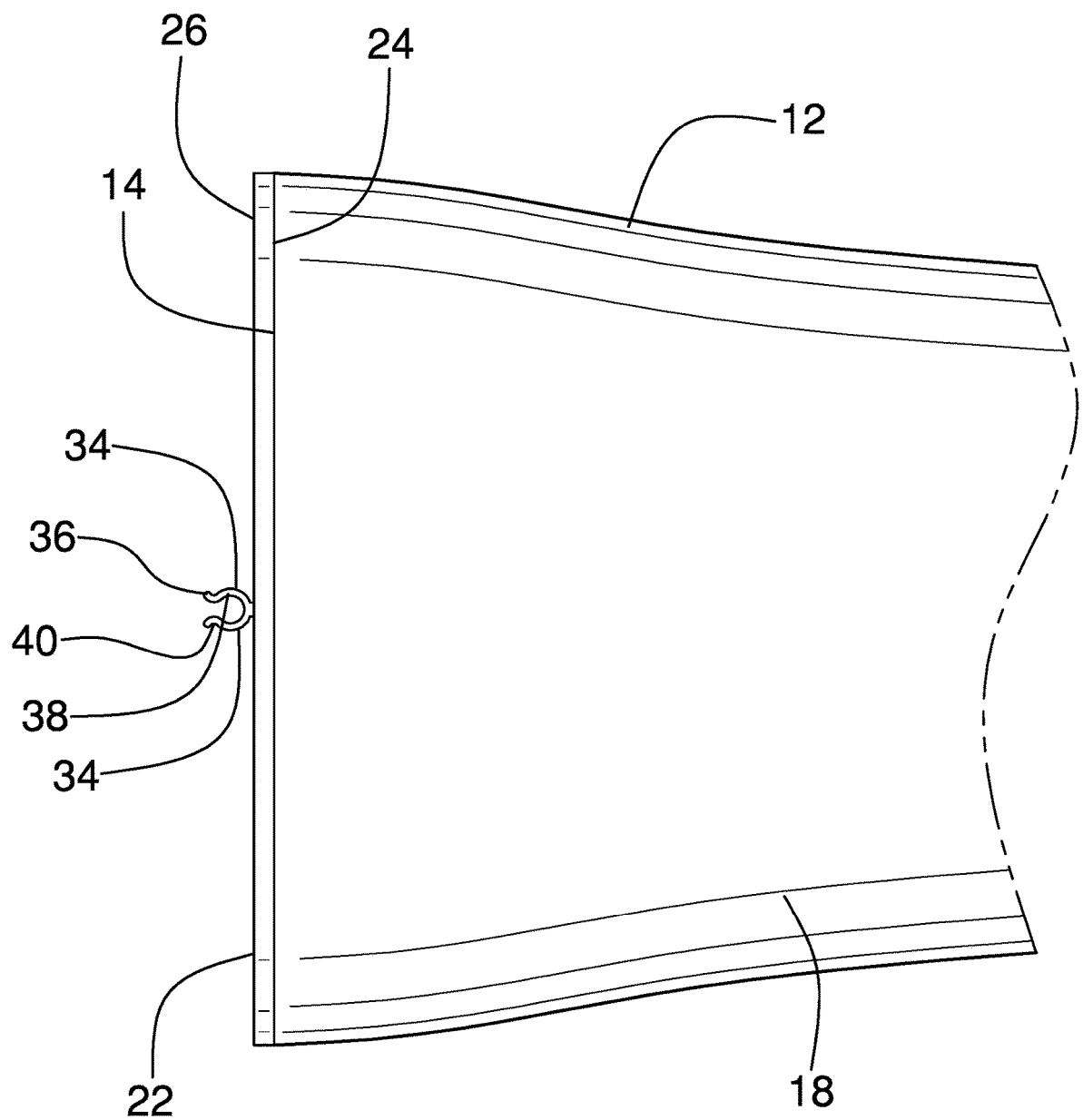
FIG. 3 is a right side view of an embodiment of the disclosure.
Figure 4:
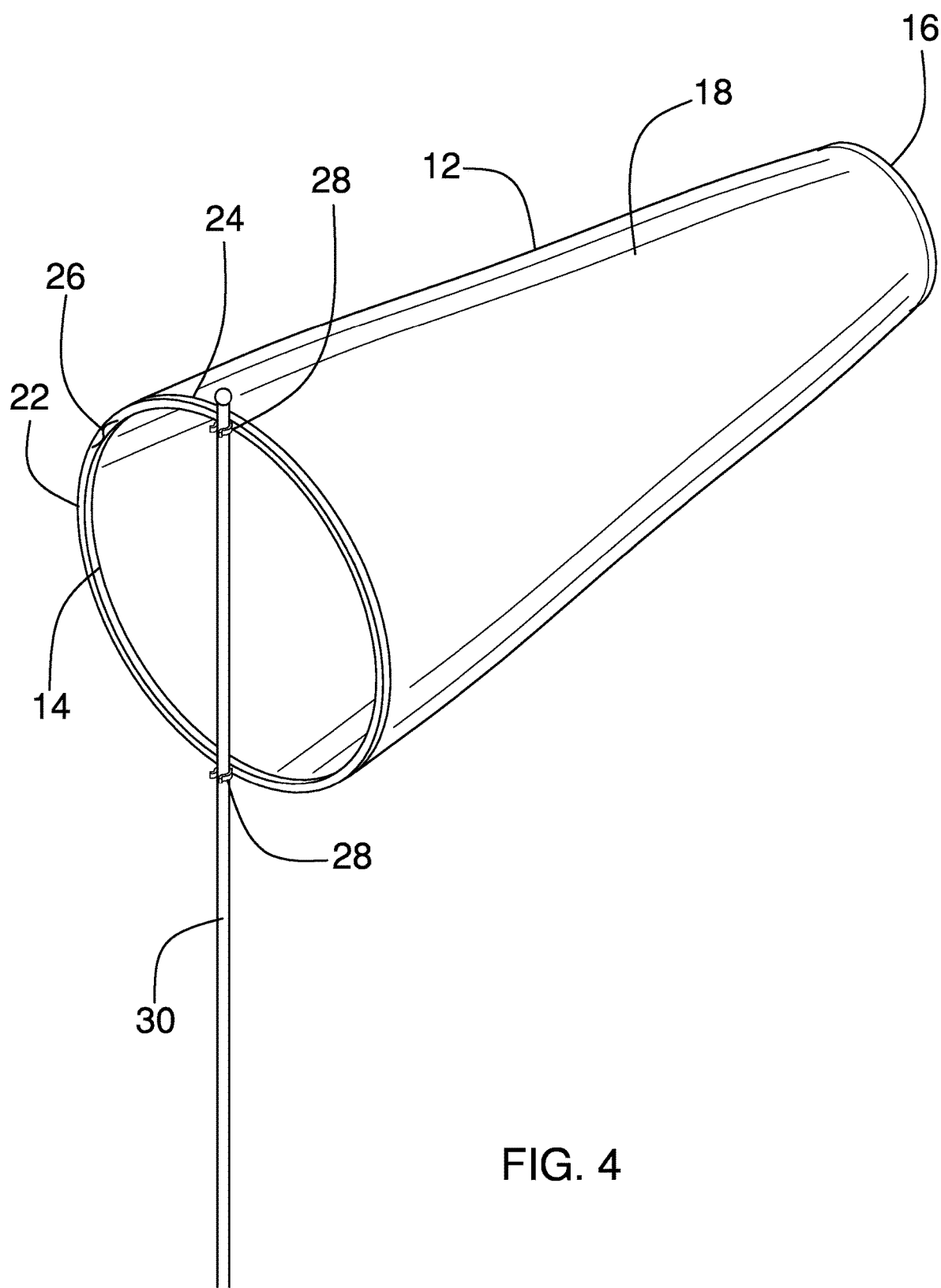
FIG. 4 is a perspective in-use view of an embodiment of the disclosure showing a windsock attached to a radio antenna.
Figure 5:
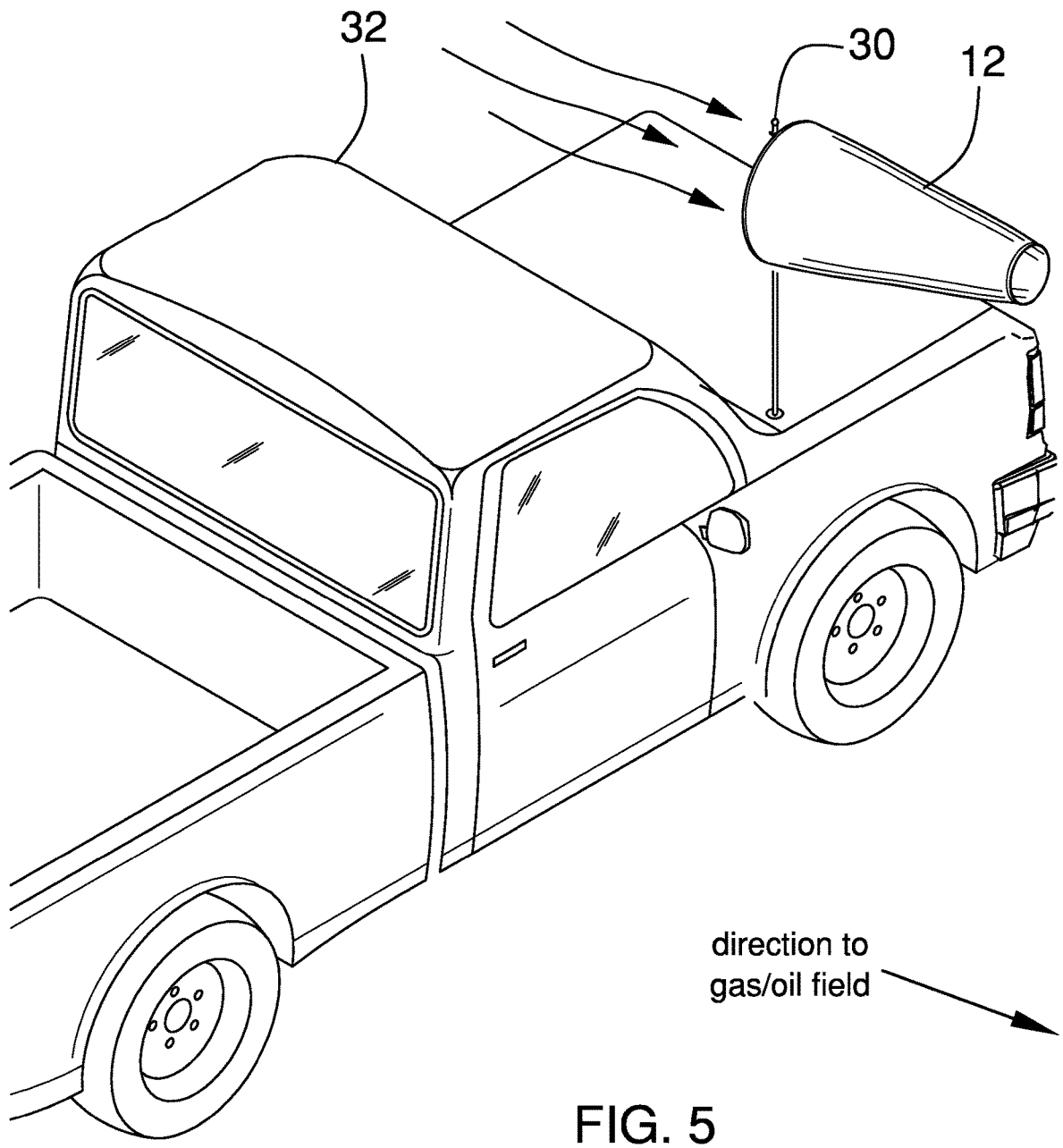
FIG. 5 is a perspective in-use view of an embodiment of the disclosure showing a windsock mounted to a vehicle.

With reference now to the drawings, and in particular to FIGS. 1 through 5 thereof, a new windsock device embodying the principles and concepts of an embodiment of the disclosure and generally designated by the reference numeral 10 will be described.

As best illustrated in FIGS. 1 through 5, the antenna windsock assembly 10 generally comprises a windsock 12 that is comprised of an air impermeable material to capture wind. The air permeable material may include, but not be limited to, plastic or rubber such that the windsock 12 resists being damaged or degraded by the wind. The windsock 12 is elongated thereby facilitating the windsock 12 to be elongated by the wind to indicate the direction of the wind. The windsock 12 has a first end 14, a second end 16 and an outer wall 18 extending between the first end 14 and the second end 16. Each of the first end 14 and the second end 16 is open and the outer wall 18 tapers inwardly between the first end 14 and the second end 16 such that the windsock 12 has a frusto-conical shape.

A ring 22 is integrated into the windsock 12 such that the ring 22 retains the windsock 12 in an open position. In this way the ring 22 facilitates the wind to flow into the windsock 12. The ring 22 has a first surface 24 and a second surface 26, and the first surface 24 is bonded to the first end 14 of the windsock 12. The ring 22 is comprised of a rigid material such that the ring 22 continually retains the first end 14 of the windsock 12 in the open position.

A pair of clips 28 is provided and each of the clips 28 is coupled to the ring 22. Each of the clips 28 is attachable to a radio antenna 30 of a vehicle 32. In this way the windsock 12 is visible to a driver of the vehicle 32 thereby facilitating the driver to determine the direction of the wind. The vehicle 32 may be a service vehicle that is operating on or near an oil field. In this way the driver of the vehicle 32 can ensure they are not positioned downwind from a source of hazardous gases, such as Hydrogen Sulfide gas for example, that are commonly associated with oil fields. Thus, the driver can ensure that they are not exposed to the hazardous gases.

Each of the clips 28 is positioned on the second surface 26 of the ring 22 and each of the clips 28 is positioned on opposing sides of the ring 22 from each other. Each of the clips 28 comprises a pair of arms 34 that are spaced apart from each other and each of the arms 34 has a distal end 36 with respect to the second surface 26 of the ring 22. Each of the arms 34 has a first curve 38 that is integrated into the arms 34 such that each of the arms 34 curves away from each other. Additionally, the first curve 38 in each of the arms 34 forms a circular shape to conform to the radio antenna 30. In this way the clips 28 can rotate around the radio antenna 30 to facilitate the windsock 12 to be aligned with the direction of the wind.

Each of the arms 34 has a second curve 40 that is integrated into the arms 34 and the second curve 40 is positioned between the first curve 38 and the distal end 36 of the arms 34. The second curve 40 on each of the arms 34 curves in an opposite direction with respect to the first curve 38 on the arms 34. Thus, the distal end 36 of each of the arms 34 is directed away from each other to facilitate the radio antenna 30 to pass between the distal end 36 of the arms 34. Furthermore, each of the arms 34 is biased toward each other and each of the arms 34 is urgeable away from each other. In this way the pair of arms 34 facilitates the radio antenna 30 to be inserted into the circular shape defined by the first curve 38 on each of the arms 34.

In use, each of the clips 28 is attached to the radio antenna 30 of the vehicle 32. In this way the windsock 12 will be visible to the driver of the vehicle 32. Thus, the driver of the vehicle 32 can determine if they are located downwind from a source of hazardous gases in an oilfield. In this way the driver of the vehicle 32 can drive to a location that is not downwind of the source of hazardous gases. Thus, the driver of the vehicle 32 can protect themselves from being exposed to the hazardous gases.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An antenna windsock assembly for attaching to a vehicle radio antenna to indicate wind direction, said assembly comprising:
    a windsock being comprised of an air impermeable material wherein said windsock is configured to capture wind, said windsock being elongated wherein said windsock is configured to be elongated by the wind to indicate the direction of the wind;
    a ring being integrated into said windsock such that said ring retains said windsock in an open position wherein said ring is configured to facilitate the wind to flow into said windsock; and
    a pair of clips, each of said clips being coupled to said ring, each of said clips being attachable to a radio antenna of a vehicle wherein said windsock is configured to be visible to a driver of the vehicle thereby facilitating the driver to determine the direction of the wind.

2. The assembly according to claim 1, wherein:
    said windsock has a first end, a second end and an outer wall extending between said first end and said second end, each of said first end and said second end being open, said outer wall tapering inwardly between said first end and said second end such that said windsock has a frusto-conical shape; and
    said ring has a first surface and a second surface, said first surface being bonded to said first end of said windsock.

3. The assembly according to claim 1, wherein:
    said ring has a first surface and a second surface; and
    each of said clips is positioned on said second surface of said ring, each of said clips being positioned on opposing sides of said ring from each other, each of said clips comprising a pair of arms being spaced apart from each other, each of said arms having a distal end with respect to said second surface of said ring.

4. The assembly according to claim 3, wherein each of said arms has a first curve being integrated into said arms such that each of said arms curves away from each other such that said first curve in each of said arms forms a circular shape wherein said first curve in each of said arms is configured to conform to the radio antenna.

5. The assembly according to claim 4, wherein each of said arms has a second curve being integrated into said arms, said second curve being positioned between said first curve and said distal end of said arms, said second curve on each of said arms curving in an opposite direction with respect to said first curve on said arms such that said distal end of each of said arms is directed away from each other wherein said distal end of each of said arms is configured to facilitate the radio antenna to pass between said distal end of said arms.

6. The assembly according to claim 4, wherein each of said arms is biased toward each other, each of said arms being urgeable away from each other wherein said pair of arms is configured to facilitate the radio antenna to be inserted into the circular shape defined by said first curve on each of said arms.

7. An antenna windsock assembly for attaching to a vehicle radio antenna to indicate wind direction, said assembly comprising:
    a windsock being comprised of an air impermeable material wherein said windsock is configured to capture wind, said windsock being elongated wherein said windsock is configured to be elongated by the wind to indicate the direction of the wind, said windsock having a first end, a second end and an outer wall extending between said first end and said second end, each of said first end and said second end being open, said outer wall tapering inwardly between said first end and said second end such that said windsock has a frusto-conical shape;

a ring being integrated into said windsock such that said ring retains said windsock in an open position wherein said ring is configured to facilitate the wind to flow into said windsock, said ring having a first surface and a second surface, said first surface being bonded to said first end of said windsock; and a pair of clips, each of said clips being coupled to said ring, each of said clips being attachable to a radio antenna of a vehicle wherein said windsock is configured to be visible to a driver of the vehicle thereby facilitating the driver to determine the direction of the wind, each of said clips being positioned on said second surface of said ring, each of said clips being positioned on opposing sides of said ring from each other, each of said clips comprising a pair of arms being spaced apart from each other, each of said arms having a distal end with respect to said second surface of said ring, each of said arms having a first curve being integrated into said arms such that each of said arms curves away from each other such that said first curve in each of said arms forms a circular shape wherein said first curve in each of said arms is configured to conform to the radio antenna, each of said arms having a second curve being integrated into said arms, said second curve being positioned between said first curve and said distal end of said arms, said second curve on each of said arms curving in an opposite direction with respect to said first curve on said arms such that said distal end of each of said arms is directed away from each other wherein said distal end of each of said arms is configured to facilitate the radio antenna to pass between said distal end of said arms, each of said arms being biased toward each other, each of said arms being urgeable away from each other wherein said pair of arms is configured to facilitate the radio antenna to be inserted into the circular shape defined by said first curve on each of said arms.

8. An antenna windsock system for attaching to a vehicle radio antenna to indicate wind direction, said system comprising:

a vehicle having a radio antenna;

a windsock being comprised of an air impermeable material wherein said windsock is configured to capture wind, said windsock being elongated wherein said windsock is configured to be elongated by the wind to indicate the direction of the wind, said windsock having a first end, a second end and an outer wall extending between said first end and said second end, each of said first end and said second end being open, said outer wall tapering inwardly between said first end and said second end such that said windsock has a frusto-conical shape;

a ring being integrated into said windsock such that said ring retains said windsock in an open position wherein said ring is configured to facilitate the wind to flow into said windsock, said ring having a first surface and a second surface, said first surface being bonded to said first end of said windsock; and a pair of clips, each of said clips being coupled to said ring, each of said clips being attachable to said radio antenna of said vehicle wherein said windsock is configured to be visible to a driver of the vehicle thereby facilitating the driver to determine the direction of the wind, each of said clips being positioned on said second surface of said ring, each of said clips being positioned on opposing sides of said ring from each other, each of said clips comprising a pair of arms being spaced apart from each other, each of said arms having a distal end with respect to said second surface of said ring, each of said arms having a first curve being integrated into said arms such that each of said arms curves away from each other such that said first curve in each of said arms forms a circular shape to conform to said radio antenna, each of said arms having a second curve being integrated into said arms, said second curve being positioned between said first curve and said distal end of said arms, said second curve on each of said arms curving in an opposite direction with respect to said first curve on said arms such that said distal end of each of said arms is directed away from each other to facilitate said radio antenna to pass between said distal end of said arms, each of said arms being biased toward each other, each of said arms being urgeable away from each other to facilitate said radio antenna to be inserted into the circular shape defined by said first curve on each of said arms.

* * * * *